(12) United States Patent
Mercer

(10) Patent No.: US 9,304,658 B2
(45) Date of Patent: Apr. 5, 2016

(54) ON-SCREEN MENU BUTTONS INCLUDING MULTIPLE MODES

(75) Inventor: Paul Mercer, Palo Alto, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1946 days.

(21) Appl. No.: 11/967,218

(22) Filed: Dec. 30, 2007

(65) Prior Publication Data

US 2009/0172597 A1     Jul. 2, 2009

(51) Int. Cl.
| | |
|---|---|
| G06F 3/00 | (2006.01) |
| G06F 9/00 | (2006.01) |
| G06F 17/00 | (2006.01) |
| G06F 3/0482 | (2013.01) |
| G06F 3/0488 | (2013.01) |

(52) U.S. Cl.
CPC ............ *G06F 3/0482* (2013.01); *G06F 3/0488* (2013.01)

(58) Field of Classification Search
CPC ... G06F 3/0482; G06F 3/0488; G06F 3/0484; G06F 9/4443; G06F 8/34; G06F 3/0486; G06F 8/38; G06F 3/0481; G06F 3/04812; G06F 3/04847; G06Q 10/10; H04N 1/00389; H04N 1/00411
USPC ......... 715/762, 763, 810, 825, 828, 829, 835, 715/836, 840, 841, 845, 865
See application file for complete search history.

(56) References Cited

U.S. PATENT DOCUMENTS

| | | | | |
|---|---|---|---|---|
| 6,433,801 | B1 * | 8/2002 | Moon et al. .................... | 715/840 |
| 2001/0055038 | A1 * | 12/2001 | Kim .............................. | 345/810 |
| 2003/0011638 | A1 * | 1/2003 | Chung .......................... | 345/808 |
| 2004/0267871 | A1 * | 12/2004 | Pratley et al. ................. | 709/200 |
| 2005/0009571 | A1 * | 1/2005 | Chiam et al. .................. | 455/566 |
| 2005/0076309 | A1 | 4/2005 | Goldsmith | |
| 2006/0048067 | A1 * | 3/2006 | DeSpain et al. ............... | 715/768 |
| 2006/0187212 | A1 * | 8/2006 | Park et al. ..................... | 345/169 |

(Continued)

FOREIGN PATENT DOCUMENTS

| | | |
|---|---|---|
| CN | 1904816 A | 1/2007 |
| CN | 1936797 A | 3/2007 |

(Continued)

OTHER PUBLICATIONS

Chinese Office Action, Chinese Patent Application No. 200880126861.7, Date: Sep. 13, 2012, pp. 1-7.

(Continued)

*Primary Examiner* — Kieu Vu
*Assistant Examiner* — Anita D Chaudhuri
(74) *Attorney, Agent, or Firm* — Kilpatrick Townsend & Stockton LLP

(57) ABSTRACT

Menu items are displayed on a screen, for example in the form of user-activatable on-screen buttons. A root menu is displayed, including a "more" button that allows the user to navigate to one or more sub-menus. Each menu can contain function buttons, menu buttons, or any combination thereof. Function buttons provide direct access to functions. Menu buttons provide access to sub-menus, which may be provided in a hierarchical arrangement. In some sub-menus, a menu title button replaces the "more" button and provides access to a previously displayed menu. The user can activate a displayed function button in any menu or sub-menu to perform an action associated with the function button. In one aspect, all menus are displayed in the same area of the screen. When a menu is to be displayed, it replaces the previously displayed menu.

34 Claims, 9 Drawing Sheets

(56) References Cited

U.S. PATENT DOCUMENTS

2007/0118235 A1   5/2007   Hsieh et al.
2007/0130532 A1*  6/2007   Fuller et al. .................. 715/764
2007/0162872 A1   7/2007   Hong et al.
2007/0247440 A1  10/2007   Shin et al.
2008/0074399 A1*  3/2008   Lee .............................. 345/173

FOREIGN PATENT DOCUMENTS

CN          1936798 A     3/2007
CN          1940833 A     4/2007
EP          0513553 A2   11/1992
WO       WO-9717650 A1    5/1997
WO      WO-03062978 A2    7/2003

OTHER PUBLICATIONS

Supplementary European Search Report—EP08870067—Search Authority—Munich—Dec. 4, 2015.

\* cited by examiner

ON-SCREEN MENU BUTTONS INCLUDING MULTIPLE MODES

FIELD OF THE INVENTION

In various embodiments, the present invention relates to on-screen menus and buttons for devices such as personal digital assistants, and more particularly to techniques for providing multiple modes for such on-screen elements.

DESCRIPTION OF THE RELATED ART

Conventional graphical user interfaces often use a menu structure to provide access to a large number of functions, commands, and operations. These menu structures provide a hierarchical framework for organizing commands. Furthermore, since menus are usually hidden until activated, these menu structures provide a mechanism by which screen space is used effectively.

FIGS. 1A and 1B depict a menu architecture for a computer system using a graphical user interface according to the prior art. FIG. 2 depicts as similar menu architecture presented on a personal digital assistant (PDA) according to the prior art. A menu bar 101 is provided, for accessing functions that the user may wish to perform with regard to the document that is currently open in a window 100. The menu bar 101 includes a number of menu titles 102, such as File, Edit, View, Insert, Format, and the like. The user opens a menu 103 by clicking on the appropriate menu title 102, or by navigating to the desired menu title 102 using a keyboard (not shown). In response, the system opens the selected menu 103, so that the items 104 in that menu 103 are displayed. The user can then select a menu item 104 from the open menu 103 by clicking on the item 104 or by navigating to it using a keyboard. The selected item 104 is then activated or opened. For example, if the menu item 104 is a command, the command is activated.

In some graphical user interfaces, multiple-level hierarchical menus are provided. Thus, one or more of the items 104 in a menu can open a sub-menu when activated; examples are shown in FIG. 1B and are indicated by a triangle 105 adjacent to the menu item 104. The user can then select an item from the open sub-menu (not shown), either clicking on the item or by navigating to it using a keyboard.

The user can dismiss a menu 103 (or sub-menu) by opening another menu 103, or by clicking on another area of the screen outside the open menu 103, or by hitting a key such as an Escape key.

The above-described operations are well known and widely used in conventional graphical user interfaces. However, this conventional menu-based architecture is ill-suited to certain types of devices, users, or applications. For example, in devices having smaller screens, it can be difficult to effectively display all available menu titles and menu items in a reasonable size. In particular, for devices in which a touch-sensitive screen is used, it is preferable that the available menu titles and menu items be large enough so that they can be actuated by a finger, so as to avoid the need for a stylus. Conventional menu structures often do not permit the display of available menu titles and items in a large enough fashion to permit finger actuation on a small screen.

Furthermore, many users find existing menu structures to be difficult to use, particularly in complex software applications were a large number of menus and items are available.

Furthermore, in many existing menu-based systems, open menus can obscure parts of the screen that would otherwise form part of the user's workspace, as can be seen from FIGS. 1B and 2, where the open menu 103 obscures part of the document or workspace displayed in the window 100. This can be undesirable, particularly for devices having small screens, as the user is often interested in seeing available menu items while also viewing the workspace.

What is needed, therefore, is a system and method for displaying on-screen menu items in a manner that avoids the limitations of conventional menu structures. What is further needed is a system and method for displaying on-screen menu items in a manner that is adapted to devices with small screens and that enables the on-screen items to be actuated with a finger. What is further needed is a system and method for displaying on-screen menu items in a simplified manner that provides access to software functionality without obscuring a user's workspace.

SUMMARY OF THE INVENTION

In various embodiments, the present invention is a system and method for displaying on-screen menu items in a manner that avoids the limitations of conventional menu structures. According to embodiments of the present invention, menu items are displayed on a screen, for example in the form of on-screen buttons that can be activated by tapping (with a finger, stylus, or the like), or by navigating and selecting via a keyboard or pointing device. For ease of nomenclature, these items are referred to herein as "buttons", although they are generally implemented as on-screen user-activatable regions rather than as physical buttons.

In various embodiments, the present invention can be implemented as part of a graphical user interface for controlling software on an electronic device having a display screen, such as a handheld computer, personal digital assistant, personal computer, kiosk, cellular telephone, and the like.

In one embodiment of the present invention, a root menu is displayed, including a menu navigation button, referred to herein as a "more" button, that allows the user to navigate among a set of menus. Specifically, the "more" button provides access to one or more sub-menus. The root menu and each sub-menu can contain function buttons, menu buttons, or any combination thereof. Function buttons provide direct access to functions. Menu buttons provide access to sub-menus. The user can navigate among a hierarchy of sub-menus by successively activating menu buttons, return buttons, and/or title buttons. The user can activate a displayed function button in any menu or sub-menu to perform an action associated with the function button.

In one embodiment, all menus are displayed in the same area of the screen, in a manner that does not obscure the workspace. When a menu is to be displayed, it replaces the previously displayed menu. Thus, only a limited set of buttons is presented on the screen at any given time. In this manner, each button can be presented in a large enough size that permits finger actuation. Also, by presenting only a limited set of buttons at any given time, the present invention provides access to functions without obscuring the workspace.

In one embodiment, a "more" button and other buttons provide easy navigation among the various menus. Thus, the user is able to access all functions of the software application or operating system, even when the application or operating system is complex and includes many functions. Menus are hierarchically organized to facilitate access to functions by entering nested sub-menus. Consistent placement of the "more" button and of menu title buttons facilitates ease of use, ease of learning, and user understanding of context.

BRIEF DESCRIPTION OF THE DRAWINGS

The accompanying drawings illustrate several embodiments of the invention and, together with the description, serve to explain the principles of the invention. One skilled in the art will recognize that the particular embodiments illustrated in the drawings are merely exemplary, and are not intended to limit the scope of the present invention.

DETAILED DESCRIPTION OF THE EMBODIMENTS

In various embodiments, the present invention can be implemented on a display screen of any electronic device, such as a handheld computer, personal digital assistant (PDA), personal computer, kiosk, cellular telephone, and the like. For example, the invention can be implemented as a control paradigm for accessing functions in a software application or operating system running on such a device. Accordingly, the present invention can be implemented as part of a graphical user interface for controlling software on such a device.

In one embodiment, the invention is particularly well-suited to devices such as PDAs, which have limited screen space and are often capable of accepting finger-actuated commands via a touch-sensitive screen. The present invention provides a mechanism for facilitating navigation through a menu-based paradigm wherein menu items are displayed on a screen. The menu items can be displayed, for example in the form of on-screen buttons that can be activated by tapping (with a finger, stylus, or the like), or by navigating and selecting via a keyboard or pointing device. In one embodiment, keyboard shortcuts can be provided, so that the user can activate an on-screen button by activating a physical key on a keyboard. For ease of nomenclature, these items are referred to herein as "buttons", although they are generally implemented as on-screen user-activatable regions rather than as physical buttons.

Figure 1A:
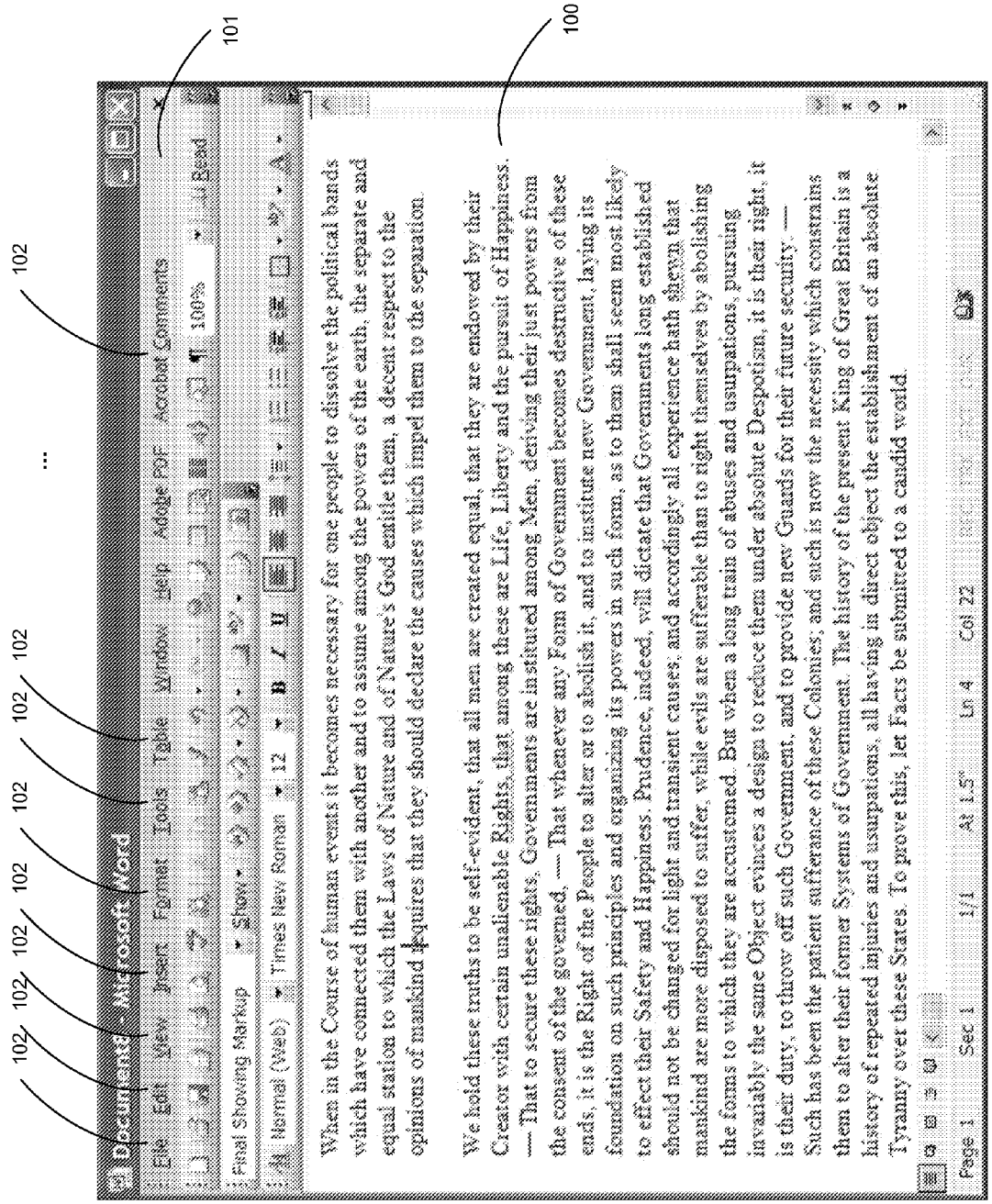
FIGS. 1A and 1B depict operation of a conventional menu-based graphical user interface on a personal computer.
Figure 1B:
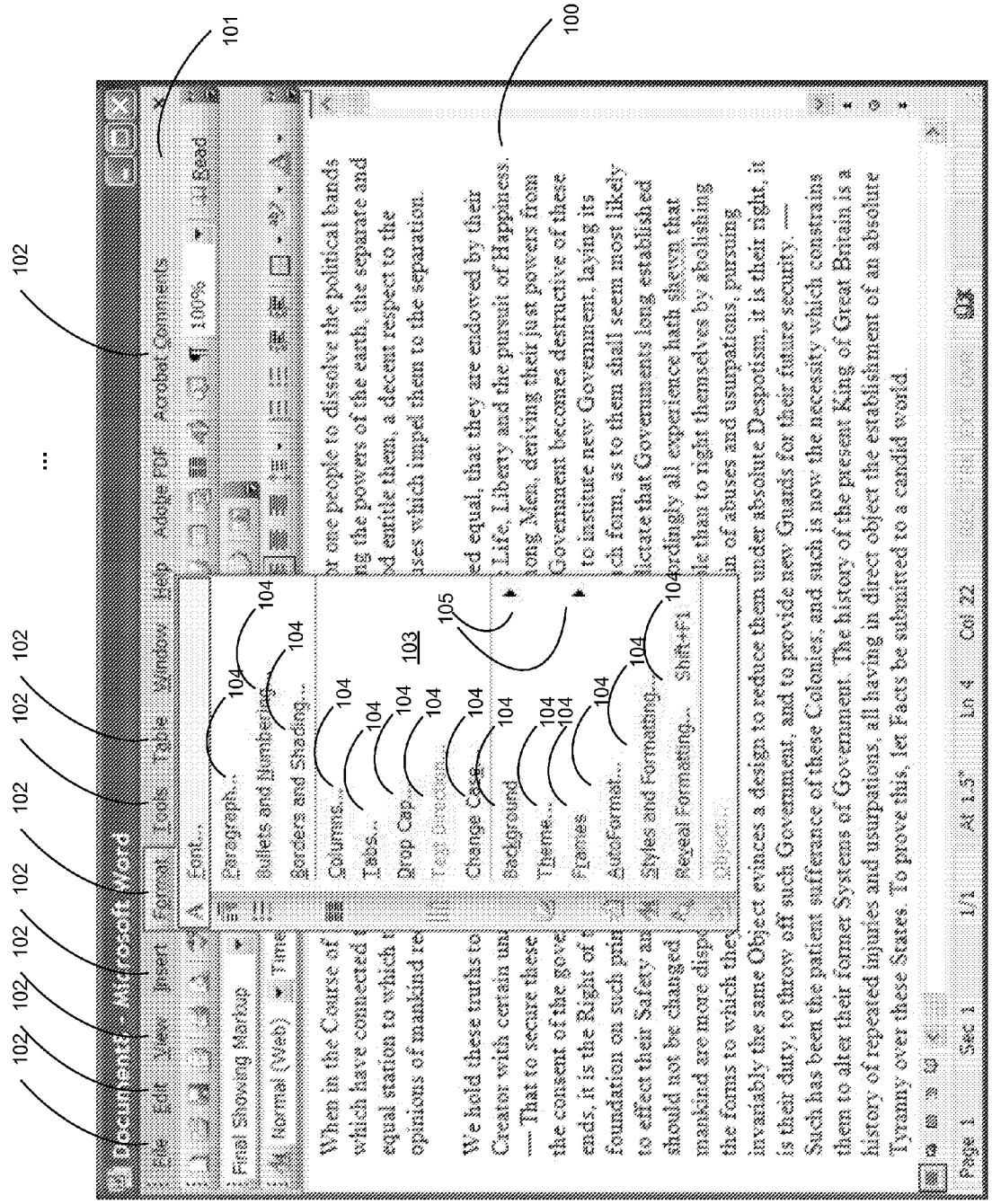
Figure 2:
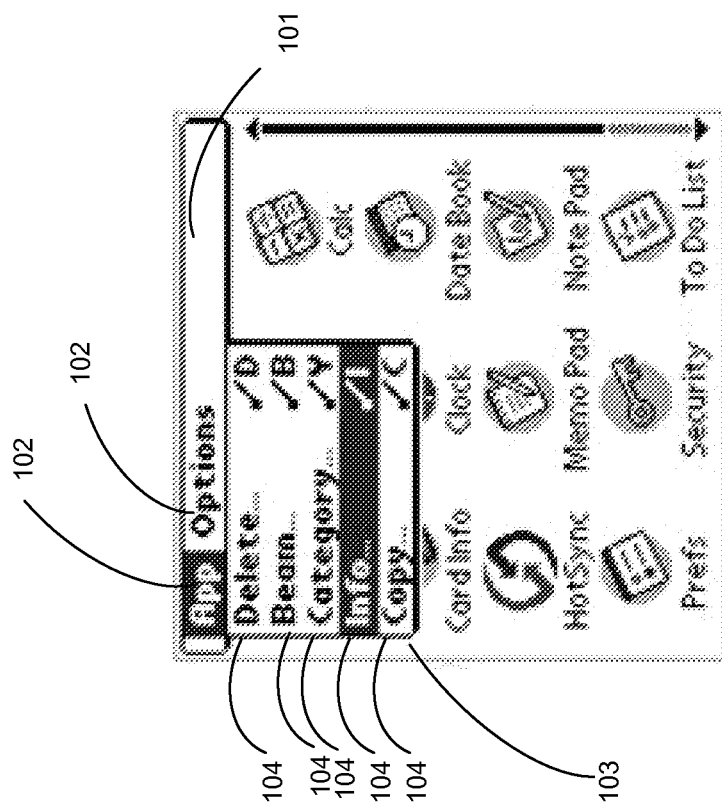
FIG. 2 depicts operation of a conventional menu-based graphical user interface on a personal digital assistant (PDA).
Figure 3:
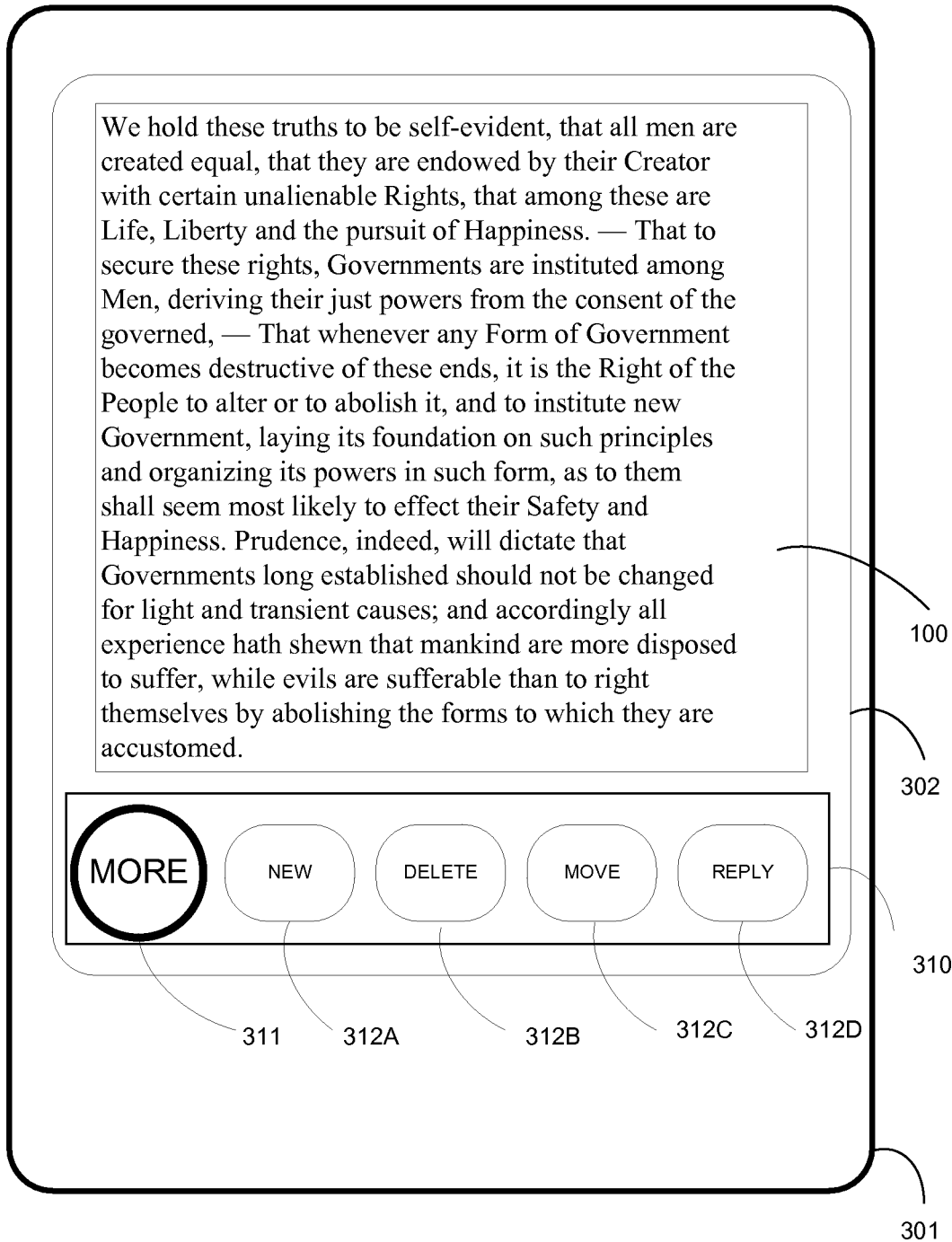
FIG. 3 depicts an example of a menu according to the present invention, displayed on a PDA.

Referring now to FIG. 3, there is shown an example of a root menu 310 as it might be displayed on a PDA 301 according to one embodiment of the present invention. Root menu 310 is shown on a display screen 302 that also includes a workspace 100, where a user might be viewing or working on a document such as a word processing document, web page, email message, or the like. In one embodiment, root menu 310 and all other menus of the present invention are displayed in a consistent location within display screen 302, without obscuring any part of workspace 100.

In one embodiment, the root menu 310 includes an initial set of buttons 311, 312A-312D. Some or all of the buttons may provide direct access to software functions, so that activating one of the buttons causes a particular function or command to be initiated. These buttons are referred to as "function buttons" 312. The user can activate a function button 312 by tapping on it with a finger, stylus, or other object, or by selecting and activating using a pointing device or keyboard (not shown). Activating a function button 312 causes the corresponding action to take place.

In one embodiment, one (or more) of the buttons in the root menu 310 does not directly access a software function, but instead is a menu navigation button that provides access to at least one sub-menu of buttons; this button is referred to as a "'more' button" 311.

For illustrative purposes, FIGS. 4 through 7 show various traversals through the following example menu structure (nesting is used to denote the hierarchical relationship among the menus):

Root menu 310: New, Delete, Move Reply
  Sub-menu 401A: Edit, Send, Snap, Prefs
    Edit sub-menu 401C: Cut, Copy, Paste, Style
      Style sub-menu 401D: Bold, Italic, Font, Size
  Sub-menu 401B: Accounts, Setup, Save Draft, Change Priority The "more" button 311 and/or title buttons 502 are shown on the left side of menus in all the examples provided herein; however, these buttons can be displayed in any other desired location, such as on the right side of menus or in any other location.

Figure 4:
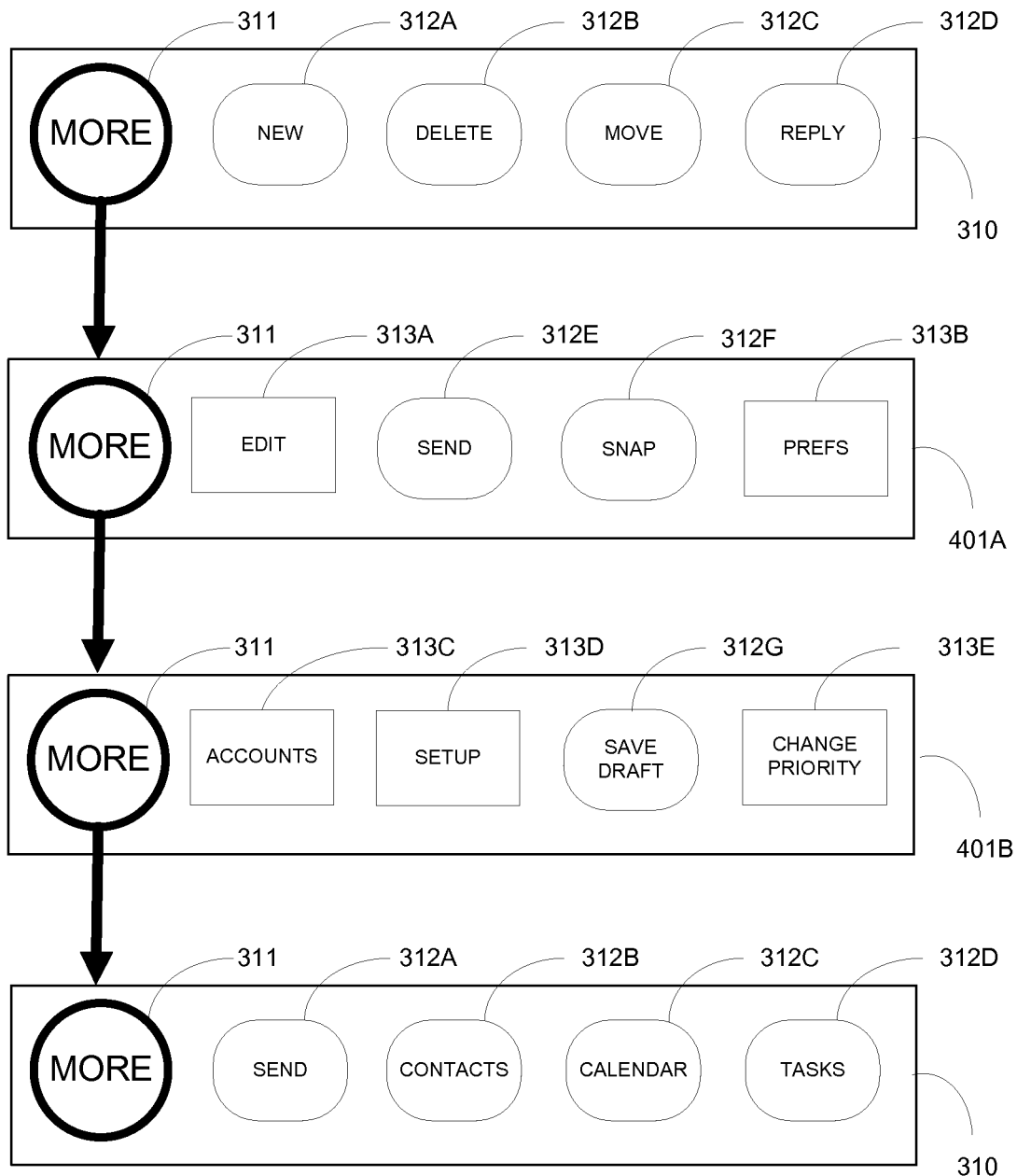
FIG. 4 depicts an example of a menu sequence according to the present invention, including cycling among a root menu and at least one sub-menu.

Referring now to FIG. 4, there is shown an example of a traversal of the above-described menu structure according to one embodiment of the present invention, including cycling among the root menu 310 and two sub-menus 401A, 401B. Activating the "more" button 311 causes the device to replace the root menu 310 with a sub-menu 401A. In one embodiment the sub-menu 401A is shown in the same area of the display screen 302 as was used for the root menu 310.

In one embodiment, the "more" button 311 continues to be displayed alongside (or as part of) the sub-menu 401A. If more than one sub-menu 401 is available from the root menu 310, repeatedly activating the "more" button 311 causes the device to cycle through the available sub-menus, eventually returning to the root menu 310. For example, FIG. 4 depicts two sub-menus 401A, 401B. Activating the "more" button 311 from the root menu 310 causes sub-menu 401A to be shown. Activating the "more" button 311 from sub-menu 401A causes sub-menu 401B to be shown. Activating the "more" button 311 from sub-menu 401B causes the root menu 310 to be shown.

In one embodiment, if only one sub-menu 401 is available, activating the "more" button 311 causes the device to toggle between the root menu 310 and the one sub-menu 401.

In one embodiment, the "more" button 311 is presented in a consistent location on the screen, regardless of whether the root menu 310 or a sub-menu 401 is currently being displayed. As will be seen below, the "more" button 311 can be replaced by a menu title button in some sub-menus 401.

In one embodiment, the sub-menu 401 is substantially identical to the root menu 310, except that it may include different menu items. In another embodiment, the sub-menu 401 is distinguished from the root menu 310 by some visual attribute such as color, icon, or the like, so as to provide the user with an easy-to-understand indicator of current context.

In one embodiment, each sub-menu 401 contains its own set of buttons 312, 313. As with the root menu 310, the buttons 312, 313 in each sub-menu 401 may include function buttons 312 that provide direct access to a function. In the example of FIG. 4, the root menu includes a New function button 312A, a Delete function button 312B, a Move function button 312C, and a Reply function button 312D. Sub-menu 401A includes a Send function button 312E and a Snap function button 312F. Sub-menu 401B includes a Save Draft function button 312G.

Optionally, any or all of the buttons in the root menu 310 and/or in any sub-menu 401 can provide access to other sub-menus; these buttons are referred to as "menu buttons" 313. In the example of FIG. 4, sub-menu 401A includes an Edit menu button 313A and a Preferences menu button 313B. Sub-menu 401B includes an Accounts menu button 313C, a Setup menu button 313D, and a Change Priority menu button 313E.

In one embodiment, the button types can be color-coded or otherwise visually distinguished from one another, so as to provide the user with context and guidance. For example, function buttons and menu buttons can be shown in two different colors and/or shapes, and the "more" button can be presented in a third different color and/or shapes. In the examples shown in the Figures, the menu buttons 313 are shown as rectangles, the function buttons 312 are shown as rounded rectangles, and the "more" button 311 is a circle. Icons or other visual indicators can be provided to further assist the user in discerning the current context and to understand what to expect when a button is activated.

In one embodiment, some buttons can be visually distinguished from other buttons based on the type of functionality associated with the buttons. For example, buttons relating to application functions (such as New, Delete, Move, and Reply) might be shown with a visual attribute that distinguishes them from buttons relating to system functions (such as Edit or Send). The visual attribute may be, for example, a distinctive background color or outline.

Figure 5:
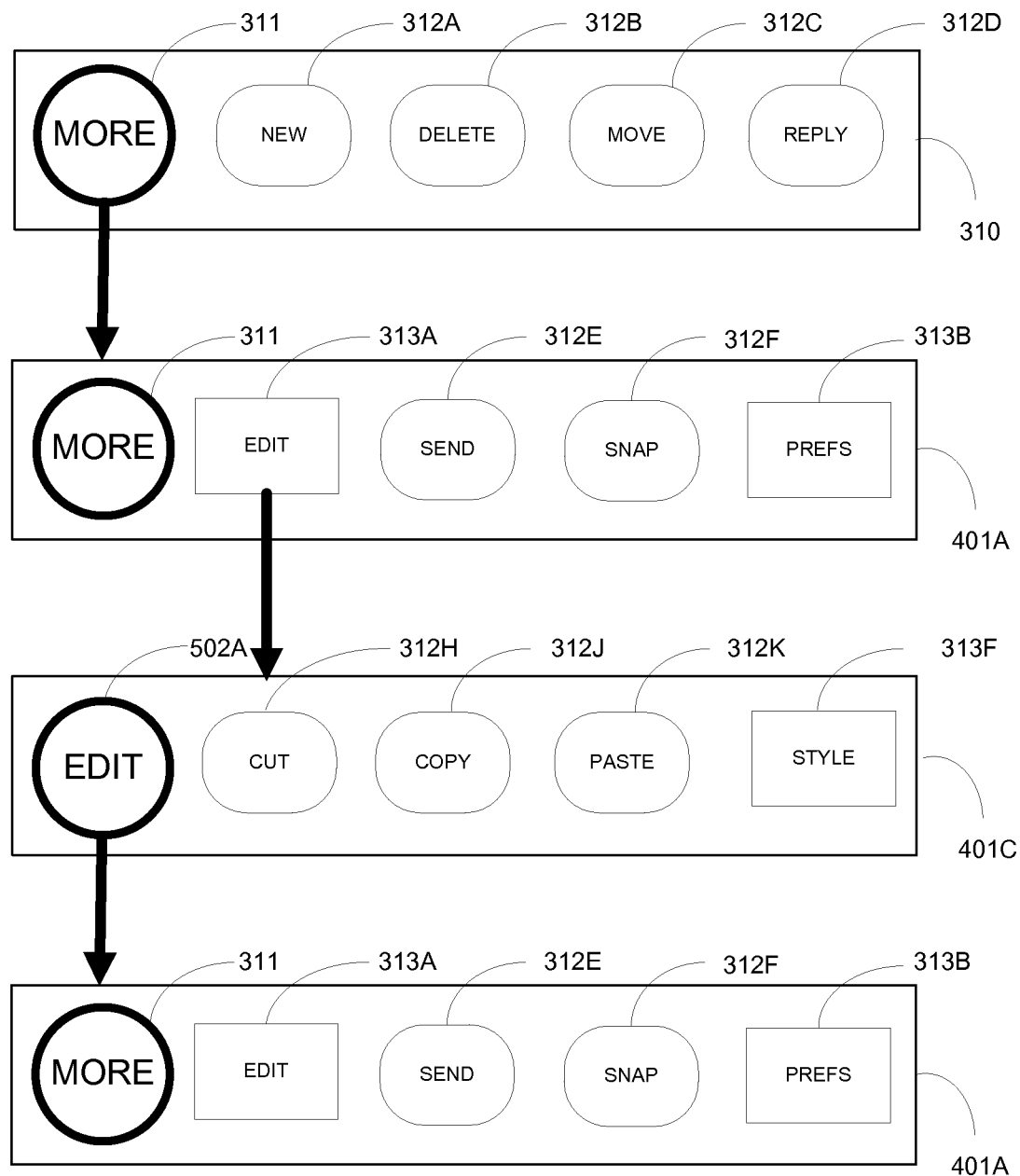
FIG. 5 depicts an example of a menu sequence according to the present invention, including entering a nested sub-menu, and returning from the nested sub-menu.

Referring now to FIG. 5, there is shown an example of a traversal of the above-described menu structure according to one embodiment of the present invention, including entering the Edit sub-menu 401C from the sub-menu 401A, and then returning to the sub-menu 401A. Activating a menu button 313 (such as the Edit menu button 313A) causes a sub-menu 401C to be displayed. This action is a mechanism for moving down one level in the menu hierarchy. The displayed sub-menu 401C can include function buttons 312 and/or additional menu buttons 313. In the example of FIG. 5, the user activates the Edit menu button 313A, causing the Edit sub-menu 401C to be displayed. The Edit sub-menu 401C includes buttons related to editing functionality: a Cut function button 312H, a Copy function button 312J, a Paste function button 312K, and a Paste Special menu button 313F.

In one embodiment, when a sub-menu 401 is displayed, it replaces the previously displayed menu (or sub-menu). A title button 502, indicating the name of the sub-menu 401, replaces the "more" button 311. In one embodiment, the user can activate the title button 502 (for example by tapping on it or otherwise selecting it), to cause the previously displayed menu or sub-menu 401 (referred to as the "parent menu") to be displayed. In another embodiment (not shown in the Figures), a "return button" is shown in the sub-menu 401, for returning to the previously displayed menu or sub-menu.

In another embodiment (not shown in the Figures), when a sub-menu 401 is displayed, it is displayed along with the parent menu. The sub-menu 401 can be dismissed by activating a return button or tapping on the title button 502. This leaves the parent menu still displayed.

FIG. 5 shows that, in one embodiment, when the user taps on the Edit title button 502A, the previously displayed sub-menu 401A is again displayed. This action is a mechanism for moving up one level in the menu hierarchy.

In one embodiment, as shown in FIG. 5, the "more" button 311 is not shown when a sub-menu 401 is displayed; instead, the title button 502 can be shown in the position normally occupied by the "more" button 311. Thus, in order to return to the root menu 310 from a sub-menu 401, the user first activates the title button 502 or return button to exit the sub-menu 401. This causes the display to move up one level in the hierarchy, returning to the previously displayed sub-menu 401 or to the root menu 310. If another sub-menu 401 is displayed, the user can repeat this process to move up the hierarchy of menus, one level at a time.

In another embodiment (not shown in the Figures), the "more" button 311 is shown in sub-menus 401 as well as on the root menu 310 and sub-menu(s) 401, thus providing the user with a way to return directly to the root menu 310 from any sub-menu 401 or sub-menu 401.

In one embodiment, the various types of menus and buttons can be color-coded or otherwise visually distinguished from one another, so as to provide the user with context and guidance. For example, function buttons and menu buttons can be shown in two different colors, and the "more" button can be presented in a third different color. The root menu can be presented in a different color or with a different visual attribute as compared with sub-menus; sub-menus can be presented in yet another color or with yet another distinguishing visual attribute. Icons or other visual indicators can be provided to further assist the user in discerning the current context and to understand what to expect when a button is activated.

In one embodiment, the various menus and sub-menus of the present invention are scrollable. The user can perform an action to cause additional buttons to be displayed within the context of a particular menu or sub-menu. In one embodiment, this is accomplished by causing the currently displayed buttons to slide horizontally (or vertically) so that they appear to move off the screen at one edge as new buttons appear to slide horizontally (or vertically) onto the screen at the other edge. In one embodiment, the "more" button 311 and/or title button 502 moves along with the other buttons when a scroll operation is performed. In another embodiment, the "more" button 311 and/or title button 502 remain in place as other buttons scroll.

In one embodiment, the various menus and sub-menus can change as the application context changes. Such changes may occur, for example in response to the user moving from one screen to another, or in response to selection and de-selection of items on the screen.

Figure 6:
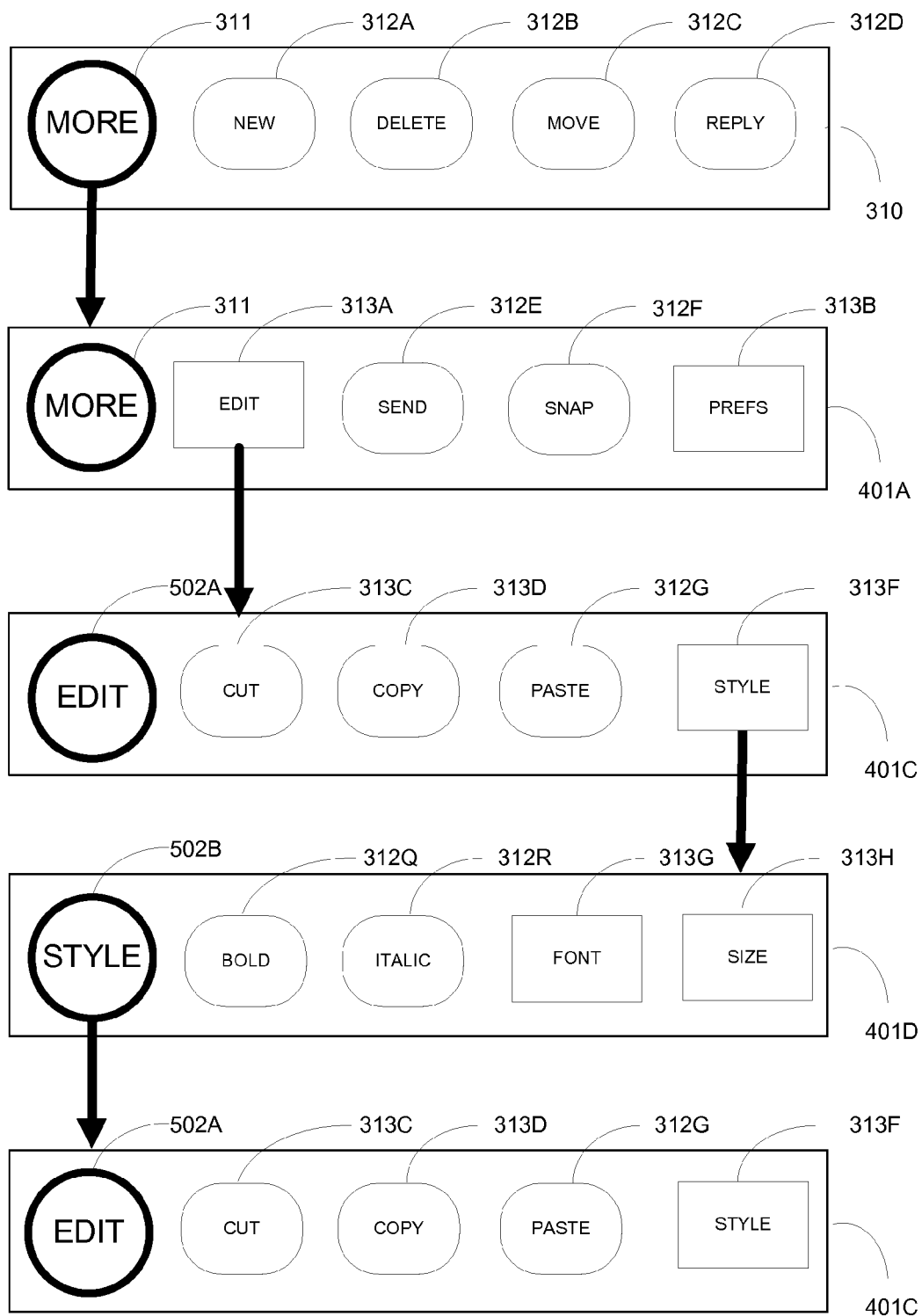
FIG. 6 depicts an example of a menu sequence according to the present invention, including entering multiple levels of nested sub-menus.

Referring now to FIG. 6, there is shown an example of a traversal of the above-described menu structure according to one embodiment of the present invention, including entering the Edit sub-menu 401C from sub-menu 401A, and then entering the Style sub-menu 401D from the Edit sub-menu 401C. This illustrates the ability of the present invention to provide a nested hierarchy of sub-menus.

In one embodiment, the user accesses sub-menu 401C in the same manner as described above in connection with FIG. 5, namely by activating the "more" button 311 to cause sub-menu 401A to be displayed, and then activating the Edit menu button 313A to cause the Edit sub-menu 401C to be displayed. As above, this is a mechanism for moving down the hierarchy of menus.

In one embodiment, the user then activates the Style menu button 313F from within the Edit sub-menu 401C to move down another level in the hierarchy. This causes a Style sub-menu 401D to be displayed, which contains functions related to the Style operation. This sub-menu 401D contains a title button 502B and four buttons: a Bold function button 312Q, an Italic function button 312R, a Font menu button 313G, and a Size menu button 313H. As will be apparent to one skilled in the art, this sub-menu 401D can include function buttons 312, menu buttons 313, and any combination thereof. By including menu buttons 313 in sub-menus, the present invention provides the ability to nest the sub-menus 401 as deeply as needed or desired.

In one embodiment, tapping on the title button 502 moves up one level in the hierarchy, causing the previously displayed menu 310 or sub-menu 401 to be displayed. Thus, in the example of FIG. 6, the user activates title button 502B to cause the display to return to the Edit sub-menu 401C. In another embodiment, a return button (not shown) can be provided for this purpose.

In one embodiment, when the user activates a function button 312 at any menu or sub-menu 401, the corresponding action is performed. The display may remain on the same menu 310 or sub-menu 401 after the action is performed, or it may return to the root menu 310, or it may return to a different sub-menu 401 or sub-menu 401. The specific choice as to which menu 310 or sub-menu 401 is displayed after an action is performed depends on the particular action and the context for that action. For example, for actions that are likely to be performed repeatedly in succession, it may be advantageous to remain on the same sub-menu 401 after performing another action. For actions that are not likely to be performed repeatedly in succession, it may be advantageous to return to the root menu 310 after performing the action.

In some cases, it may not be feasible to display a sub-menu 401 in the manner described above. For example, when a large number of options are being presented to the user, such as a selection from a long list of font styles, it may be desirable to show a pop-up menu. The present invention allows for display of a pop-up menu within the context of the menu paradigm described above.

Figure 7:
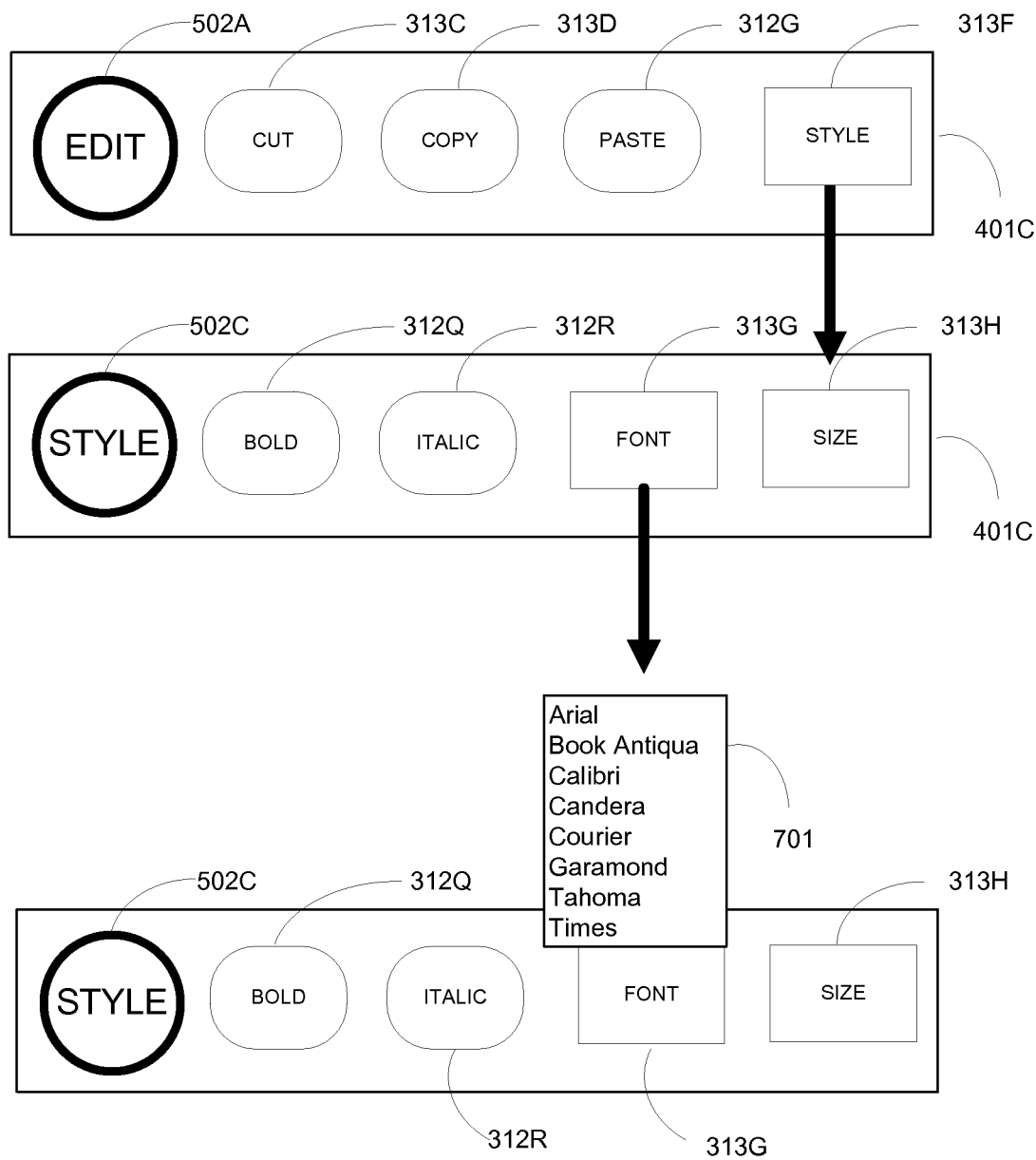
FIG. 7 depicts an example of a menu sequence according to the present invention, wherein activating a menu button causes display of a pop-up menu.

Referring now to FIG. 7, there is shown an example of a menu sequence according to one embodiment of the present invention, wherein activating a menu button 313 causes display of a pop-up menu 701. Here, the font menu button 313G is activated. Since there are many font options, it is not feasible to show a menu of font choices according to the techniques described above. Accordingly, in this context, a pop-up menu 701 is shown adjacent to, above, below, or overlaying the font menu button 313G. The user can select from the pop-up menu 701; the corresponding action is performed and the pop-up menu 701 is then dismissed.

In one embodiment, the technique shown in FIG. 7 is used only when the number of selectable items in a menu or sub-menu exceeds the practical limits of the display.

The above-described menu sequences are merely examples of particular layouts and operations that can be performed in connection with the present invention. One skilled in the art will recognize that many variations in such layouts and operations can be effected without departing from the essential characteristics of the present invention.

Figure 8:
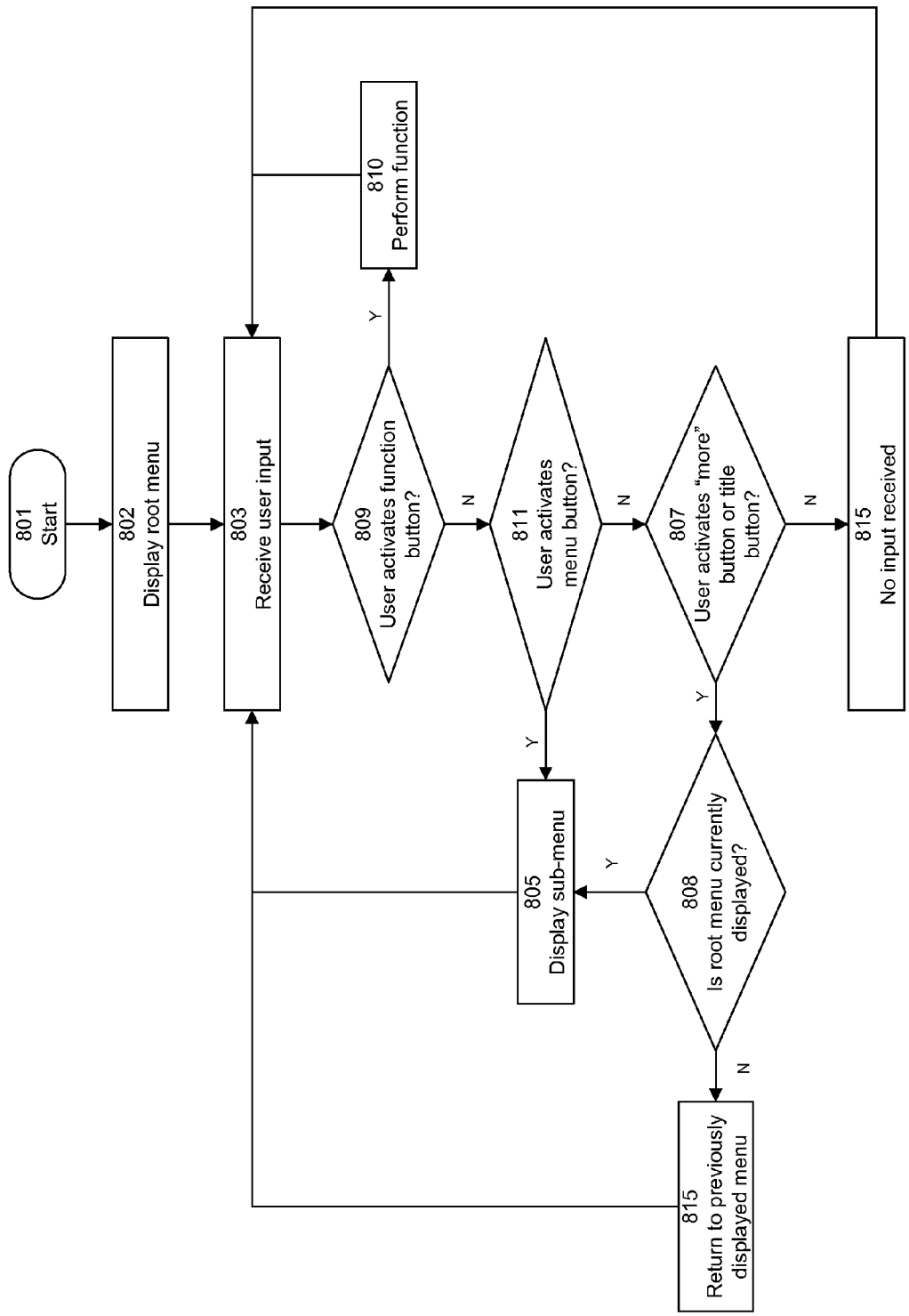
FIG. 8 is a flow chart depicting a method for practicing the present invention according to one embodiment.

Referring now to FIG. 8, there is shown a flow chart depicting a method for practicing the present invention according to one embodiment. A root menu 310 is displayed 802, including a "more" button 311, zero or more function buttons 312 and/or zero or more menu buttons 313. User input is received 803, for example in the form of the user tapping an area of the display screen or activating a button via an input device such as a keyboard, trackball, mouse, or the like.

If the user activates 809 a function button 312, the corresponding function is performed 810. Depending on the application, the activated function, and/or the context in which it was performed, the method can return to step 803 to accept further input from the user. Alternatively, the method may end or may return to step 802 to display the root menu 310.

If, in step 809, a function button 809 was not activated, the method proceeds to determine 811 whether the user activated a menu button 313. If so, the corresponding sub-menu 401 is displayed 805, so as to move down one level in the hierarchy of menus. A title button 502 (or return button) may be displayed in lieu of the "more" button 311. The method returns to step 803 to receive further input.

If the user activates 807 the "more" button 311 while the root menu 310 is currently being displayed 808, a sub-menu 401 is displayed 805 and the method returns to step 803 to receive further input.

If the user activates 807 the "more" button 311 or a title button 502 while the root menu 310 is not being displayed 808, the method moves one level up the hierarchy to return 815 to the previously displayed menu (either the root menu 310 or a sub-menu 401). In one embodiment, rather than returning to the previously displayed menu or sub-menu, the user is returned to the root menu 310 when the title button 502 or return button is pressed. In one embodiment, the user can double-tap the title button 502 or return button, or hold it down for a period of time, or tap it while holding down a modifier key, or perform some other distinctive user input action to return to root menu 310 from within any menu 401 or sub-menu 401.

In an embodiment where more than one sub-menu 401 is accessible at the top level, activation of the "more" button from one of these top-level sub-menus 401 causes the method to cycle through the available top-level sub-menus 401 and then back to the root menu 310, as illustrated in FIG. 4.

If no input was received 815, the method returns to step 803 to receive further input.

The present invention thus provides a mechanism by which a complex hierarchy of functions can be presented in a simple manner. By displaying a limited set of buttons at any given time, the present invention allows each button to be large enough to facilitate actuation using a finger on a touch screen, without consuming an excessive amount of screen. Furthermore, menus and buttons can be presented in a defined area of the screen that does not interfere with the workspace; thus, the user can navigate the menu structure without obscuring his or her work.

In addition, more frequently used functions can be elevated in the hierarchy to be more directly accessible via buttons on the root menu or on higher-level menus, whereas less commonly used functions can be relegated to sub-menus.

In one embodiment, the user can configure the system to associate certain functions with more or less prominently situated buttons.

In the Figures, text labels are provided for buttons. One skilled in the art will recognize that icons can be used instead of or in addition to text labels. In addition, the buttons are laid out in a horizontal row, with the "more" button 311 at the left side. This particular layout is merely exemplary. In various embodiments, each menu according to the present invention can include any number of buttons laid out in any desired arrangement, without departing from the essential characteristics of the invention. For example, the "more" button 311 can be provided at the right side, or below or above the other buttons. Buttons can be laid out in a vertical row, a rectangle, a circle, or according to any other arrangement.

In addition, as mentioned above, in the Figures, the menu buttons 313 are shown as rectangles, the function buttons 312 are shown as rounded rectangles, and the "more" button 311 and menu title buttons 502 are shown as circles. However, these various button types and menu titles can be distinguished from one another using any desired means, such as color coding, different font, different outline weight, and the like. In one embodiment, the button types are not visually distinct from one another, so that all buttons are shown substantially in the same manner (although with different labels and/or icons). In one embodiment, the "more" button 311 is labeled "navigation" or has some other distinctive text and/or graphic label.

The present invention has been described in particular detail with respect to one possible embodiment. Those of skill in the art will appreciate that the invention may be practiced in other embodiments. First, the particular naming of the components, capitalization of terms, the attributes, data structures, or any other programming or structural aspect is not mandatory or significant, and the mechanisms that implement the invention or its features may have different names, formats, or protocols. Further, the system may be implemented via a combination of hardware and software, as described, or entirely in hardware elements, or entirely in software elements. Also, the particular division of functionality between the various system components described herein is merely exemplary, and not mandatory; functions performed by a single system component may instead be performed by multiple components, and functions performed by multiple components may instead be performed by a single component.

Reference herein to "one embodiment", "an embodiment", or to "one or more embodiments" means that a particular feature, structure, or characteristic described in connection with the embodiments is included in at least one embodiment of the invention. Further, it is noted that instances of the phrase "in one embodiment" herein are not necessarily all referring to the same embodiment.

Some portions of the above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps (instructions) leading to a desired result. The steps are those requiring physical manipulations of physical quantities. Usually, though not necessarily, these quantities take the form of electrical, magnetic or optical signals capable of being stored, transferred, combined, compared and otherwise manipulated. It is convenient at times, principally for reasons of common usage, to refer to these signals as bits, values, elements, symbols, characters, terms, numbers, or the like. Furthermore, it is also convenient at times, to refer to certain arrangements of steps requiring physical manipulations of physical quantities as modules or code devices, without loss of generality.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "displaying" or "determining" or the like, refer to the action and processes of a computer system, or similar electronic computing module and/or device, that manipulates and transforms data represented as physical (electronic) quantities within the computer system memories or registers or other such information storage, transmission or display devices.

Certain aspects of the present invention include process steps and instructions described herein in the form of an algorithm. It should be noted that the process steps and instructions of the present invention can be embodied in software, firmware or hardware, and when embodied in software, can be downloaded to reside on and be operated from different platforms used by a variety of operating systems.

The present invention also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Further, the computers referred to herein may include a single processor or may be architectures employing multiple processor designs for increased computing capability.

The algorithms and displays presented herein are not inherently related to any particular computer, virtualized system, or other apparatus. Various general-purpose systems may also be used with programs in accordance with the teachings herein, or it may prove convenient to construct more specialized apparatus to perform the required method steps. The required structure for a variety of these systems will be apparent from the description above. In addition, the present invention is not described with reference to any particular programming language. It will be appreciated that a variety of programming languages may be used to implement the teachings of the present invention as described herein, and any references above to specific languages are provided for disclosure of enablement and best mode of the present invention.

While the invention has been described with respect to a limited number of embodiments, those skilled in the art, having benefit of the above description, will appreciate that other embodiments may be devised which do not depart from the scope of the present invention as described herein. In addition, it should be noted that the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention, which is set forth in the claims.

What is claimed is:

1. A method of successively displaying a root menu and a plurality of sub-menus in a menu region of a display screen, the method comprising:
   a) displaying a workspace for a software application in a work region of the display screen;
   b) concurrently with continued and unobstructed display of the workspace in the work region, displaying a root menu in a menu region of the display screen, the root menu comprising a plurality of on-screen buttons arranged in a single row;
   c) receiving user input activating one of the on-screen buttons;
   d) responsive to user input activating an on-screen button of the root menu corresponding to a navigation operation, dismissing the root menu and displaying, in the menu region previously occupied by the root menu, and concurrently with continued and unobstructed display of the workspace in the work region, a sub-menu comprising a plurality of on-screen buttons arranged in a single row;
   e) responsive to user input activating an on-screen button of a sub-menu corresponding to a navigation operation, dismissing the displayed sub-menu and displaying, in the menu region previously occupied by the sub-menu, and concurrently with continued and unobstructed display of the workspace in the work region, a menu other than the displayed sub-menu, the menu comprising a plurality of on-screen buttons arranged in a single row; and f) responsive to user input activating an on-screen button corresponding to a function, performing the function.

2. The method of claim 1, wherein step e) comprises dismissing the displayed sub-menu and displaying the root menu in the menu region previously occupied by the sub-menu, and concurrently with continued and unobstructed display of the workspace.

3. The method of claim 1, wherein step e) comprises dismissing the displayed sub-menu and displaying a second sub-menu comprising a plurality of on-screen buttons in the menu region previously occupied by the sub-menu, and concurrently with continued and unobstructed display of the workspace.

4. The method of claim 1, further comprising:
g) repeating steps b) through g).

5. The method of claim 1, wherein receiving user input activating one of the on-screen buttons comprises detecting physical contact with a region of the display screen corresponding to the on-screen button.

6. The method of claim 1, wherein displaying each menu comprises displaying the menu on a display screen of a device, and wherein the device comprises one selected from the group consisting of:
a personal digital assistant;
a handheld computing device;
a cellular telephone;
a personal computer;
a laptop computer;
a kiosk;
a consumer electronic device;
a navigation system; and
a media player.

7. The method of claim 1, wherein each menu is scrollable.

8. The method of claim 1, further comprising:
g) responsive to activation of an on-screen button corresponding to a pop-up menu:
displaying the corresponding pop-up menu comprising a plurality of menu items;
receiving user input activating one of the menu items; and
performing an action corresponding to the activated menu item.

9. A computer program product for successively displaying a root menu and a plurality of sub-menus in a menu region of a display screen, the computer program product comprising:
a computer-readable medium; and
computer program code, encoded on the medium, for causing a processor to perform the steps of:
a) displaying a workspace for a software application in a work region of the display screen;
b) concurrently with continued and unobstructed display of the workspace in the work region, displaying a root menu in a menu region of the display screen, the root menu comprising a plurality of on-screen buttons arranged in a single row;
c) receiving user input activating one of the on-screen buttons;
d) responsive to user input activating an on-screen button of the root menu corresponding to a navigation operation, dismissing the root menu and displaying, in the menu region previously occupied by the root menu, and concurrently with continued and unobstructed display of the workspace in the work region, a sub-menu comprising a plurality of on-screen buttons arranged in a single row;
e) responsive to user input activating an on-screen button of a sub-menu corresponding to a navigation operation, dismissing the displayed sub-menu and displaying, in the menu region previously occupied by the sub-menu, and concurrently with continued and unobstructed display of the workspace in the work region, a menu other than the displayed sub-menu, the menu comprising a plurality of on-screen buttons arranged in a single row; and
f) responsive to user input activating an on-screen button corresponding to a function, performing the function.

10. The computer program product of claim 9, wherein the computer program code for performing step e) comprises computer program code for dismissing the displayed sub-menu and displaying the root menu in the menu region previously occupied by the sub-menu, and concurrently with continued and unobstructed display of the workspace.

11. The computer program product of claim 9, wherein the computer program code for performing step e) comprises computer program code for dismissing the displayed sub-menu and displaying a second sub-menu comprising a plurality of on-screen buttons in the menu region previously occupied by the sub-menu, and concurrently with continued and unobstructed display of the workspace.

12. The computer program product of claim 9, further comprising computer program code for:
g) repeating steps b) through g).

13. The computer program product of claim 9, wherein the computer program code for receiving user input activating one of the on-screen buttons comprises computer program code for detecting physical contact with a region of the display screen corresponding to the on-screen button.

14. The computer program product of claim 9, wherein the computer program code for displaying each menu comprises computer program code for displaying the menu on a display screen of a device, and wherein the device comprises one selected from the group consisting of:
a personal digital assistant;
a handheld computing device;
a cellular telephone;
a personal computer;
a laptop computer;
a kiosk;
a consumer electronic device;
a navigation system; and
a media player.

15. The computer program product of claim 9, wherein each menu is scrollable.

16. The computer program product of claim 9, further comprising computer program code for:
g) responsive to activation of an on-screen button corresponding to a pop-up menu:
displaying the corresponding pop-up menu comprising a plurality of menu items;
receiving user input activating one of the menu items; and
performing an action corresponding to the activated menu item.

17. A system for successively displaying a root menu and a plurality of sub-menus in a menu region of a display screen, the system comprising:

an input device for receiving user input activating an on-screen button in a displayed menu;

a display screen for:
- displaying a workspace for a software application in a work region of the display screen;
- concurrently with continued and unobstructed display of the workspace in the work region, displaying a root menu in a menu region of the display screen, the root menu comprising a plurality of on-screen buttons arranged in a single row;
- responsive to user input activating an on-screen button of the root menu corresponding to a navigation operation, dismissing the root menu and displaying, in the menu region previously occupied by the root menu, and concurrently with continued and unobstructed display of the workspace in the work region, a sub-menu comprising a plurality of on-screen buttons arranged in a single row; and
- responsive to user input activating an on-screen button of a sub-menu corresponding to a navigation operation, dismissing the displayed sub-menu and displaying, in the menu region previously occupied by the sub-menu, and concurrently with continued and unobstructed display of the workspace in the work region, a menu other than the displayed sub-menu, the menu comprising a plurality of on-screen buttons arranged in a single row; and a processor, for, responsive to user input activating an on-screen button corresponding to a function, performing the function.

18. The system of claim 17, wherein the input device comprises a touch-screen.

19. The system of claim 17, wherein the display screen comprises a display screen of a device, and wherein the device comprises one selected from the group consisting of:
- a personal digital assistant;
- a handheld computing device;
- a cellular telephone;
- a personal computer;
- a laptop computer;
- a kiosk;
- a consumer electronic device;
- a navigation system; and
- a media player.

20. The method of claim 1, wherein the plurality of sub-menus is organized in a hierarchy having a plurality of levels, and wherein at least one on-screen button of at least one sub-menu comprises one selected from the group consisting of:
- a menu navigation button, for navigating from a first sub-menu to a second sub-menu, wherein the first and second sub-menus are at a common level of the hierarchy;
- a menu button, for navigating from a first sub-menu to a second sub-menu wherein the second sub-menu is at a lower level of the hierarchy than the first sub-menu;
- a menu title button, for navigating from a first sub-menu to at least one selected from the group consisting of:
  - a second sub-menu wherein the second sub-menu is at a higher level of the hierarchy than the first sub-menu; and
  - the root menu; and
- a return button, for navigating from a first sub-menu to at least one selected from the group consisting of:
  - a second sub-menu wherein the second sub-menu is at a higher level of the hierarchy than the first sub-menu; and
  - the root menu.

21. A method of successively displaying a root menu and a plurality of sub-menus in a menu region of a display screen, the method comprising:
- displaying a workspace for a software application in a work region of the display screen, the work region being separate from the menu region also displayed on the display screen;
- concurrently with continued and unobstructed display of the workspace in the work region, displaying a root menu in the menu region of the display screen, the root menu comprising a plurality of on-screen buttons;
- receiving user input activating one of the on-screen buttons;
- responsive to user input activating an on-screen button of the root menu corresponding to a navigation operation, replacing the root menu with a sub-menu comprising a plurality of on-screen buttons, wherein the sub-menu is displayed in the menu region previously occupied by the replaced root menu, and is displayed concurrently with continued and unobstructed display of the workspace in the work region;
- responsive to user input activating an on-screen button corresponding to a function, performing the function.

22. The method of claim 21, further comprising:

responsive to user activation of an on-screen button of a sub-menu corresponding to a navigation operation, replacing the displayed sub-menu with a menu other than the displayed sub-menu, the menu comprising a plurality of on-screen buttons arranged in a single row, wherein the menu is displayed in the menu region previously occupied by the replaced sub-menu, and is displayed concurrently with continued and unobstructed display of the workspace in the work region wherein replacing the displayed sub-menu with a menu other than the displayed sub-menu comprises replacing the displayed sub-menu with the root menu.

23. The method of claim 21, further comprising:

responsive to user activation of an on-screen button of a sub-menu corresponding to a navigation operation, replacing the displayed sub-menu with a menu other than the displayed sub-menu, the menu comprising a plurality of on-screen buttons arranged in a single row, wherein the menu is displayed in the menu region previously occupied by the replaced sub-menu, and is displayed concurrently with continued and unobstructed display of the workspace in the work region wherein replacing the displayed sub-menu with a menu other than the displayed sub-menu comprises replacing the displayed sub-menu with a second sub-menu comprising a plurality of on-screen buttons.

24. The computer program product of claim 9, wherein the plurality of sub-menus is organized in a hierarchy having a plurality of levels, and wherein at least one on-screen button of at least one sub-menu comprises one selected from the group consisting of:
- a menu navigation button, for navigating from a first sub-menu to a second sub-menu, wherein the first and second sub-menus are at a common level of the hierarchy;
- a menu button, for navigating from a first sub-menu to a second sub-menu wherein the second sub-menu is at a lower level of the hierarchy than the first sub-menu;
- a menu title button, for navigating from a first sub-menu to at least one selected from the group consisting of:

a second sub-menu wherein the second sub-menu is at a higher level of the hierarchy than the first sub-menu; and the root menu; and a return button, for navigating from a first sub-menu to at least one selected from the group consisting of:

a second sub-menu wherein the second sub-menu is at a higher level of the hierarchy than the first sub-menu; and the root menu.

25. A computer program product for successively displaying a root menu and a plurality of sub-menus in a menu region of a display screen, the computer program product comprising:

a computer-readable medium; and computer program code, encoded on the medium, for causing a processor to perform the steps of:

a) displaying a workspace for a software application in a work region of the display screen, the work region being separate from the menu region also displayed on the display screen, the menu region being a consistent location reserved for display of menus only;

b) concurrently with continued and unobstructed display of the workspace in the work region, displaying a root menu in the menu region of the display screen, the root menu comprising a plurality of on-screen buttons;

c) receiving user input activating one of the on-screen buttons;

d) responsive to user input activating an on-screen button of the root menu corresponding to a navigation operation, replacing the root menu with a sub-menu comprising a plurality of on-screen buttons arranged in a single row, wherein the sub-menu is displayed in the menu region previously occupied by the replaced root menu, and is displayed concurrently with continued and unobstructed display of the workspace in the work region;

e) responsive to user activation of an on-screen button of a sub-menu corresponding to a navigation operation, replacing the displayed sub-menu with a menu other than the displayed sub-menu, the menu comprising a plurality of on-screen buttons, wherein the menu is displayed in the menu region previously occupied by the replaced sub-menu, and is displayed concurrently with continued and unobstructed display of the workspace in the work region; and f) responsive to user input activating an on-screen button corresponding to a function, performing the function.

26. The computer program product of claim 25, wherein the computer program code for performing step e) comprises computer program code for replacing the displayed sub-menu with the root menu.

27. The computer program product of claim 25, wherein the computer program code for performing step e) comprises computer program code for replacing the displayed sub-menu with a second sub-menu comprising a plurality of on-screen buttons.

28. The system of claim 17, wherein the plurality of sub-menus is organized in a hierarchy having a plurality of levels, and wherein at least one on-screen button of at least one sub-menu comprises one selected from the group consisting of:

a menu navigation button, for navigating from a first sub-menu to a second sub-menu, wherein the first and second sub-menus are at a common level of the hierarchy;

a menu button, for navigating from a first sub-menu to a second sub-menu wherein the second sub-menu is at a lower level of the hierarchy than the first sub-menu;

a menu title button, for navigating from a first sub-menu to at least one selected from the group consisting of:

a second sub-menu wherein the second sub-menu is at a higher level of the hierarchy than the first sub-menu; and the root menu; and a return button, for navigating from a first sub-menu to at least one selected from the group consisting of:

a second sub-menu wherein the second sub-menu is at a higher level of the hierarchy than the first sub-menu; and the root menu.

29. A system for successively displaying a root menu and a plurality of sub-menus in a menu region of a display screen, the system comprising:

an input device for receiving user input activating an on-screen button in a displayed menu;

a display screen for:

displaying a workspace for a software application in a work region of the display screen, the work region being separate from the menu region of the display screen;

concurrently with continued and unobstructed display of the workspace in the work region, displaying a root menu in the menu region of the display screen;

responsive to user input activating an on-screen button of the root menu corresponding to a navigation operation, replacing the root menu with a sub-menu comprising a plurality of on-screen buttons arranged in a single row, wherein the sub-menu is displayed in the menu region previously occupied by the replaced root menu, and is displayed concurrently with continued and unobstructed display of the workspace in the work region; and a processor, for, responsive to user input activating an on-screen button corresponding to a function, performing the function.

30. The system of claim 29, wherein, responsive to user input activating an on-screen button of a sub-menu corresponding to a navigation operation, the display screen replaces the displayed sub-menu with the root menu.

31. The system of claim 29, wherein, responsive to user input activating an on-screen button of a sub-menu corresponding to a navigation operation, the display screen replaces the displayed sub-menu with a second sub-menu comprising a plurality of on-screen buttons.

32. The system of claim 29, wherein both the root menu and the sub-menu each comprise a button for accessing additional menu options, that button being displayed in a consistent location when either said root menu or sub-menu is displayed.

33. The system of claim 29, wherein buttons in a menu that invoke a same type of function are visual distinguished from buttons that invoke a different type of function.

34. The system of claim 29, wherein buttons in a menu scroll through the menu region when all options in a menu are not displayed at one time in the menu region.

* * * * *